United States Patent [19]

Brunnhofer

[11] 3,989,779

[45] Nov. 2, 1976

[54] METHOD OF CALIBRATING EXTRUDED FILAMENTS

[75] Inventor: Erwin Brunnhofer, Lohfelden, Germany

[73] Assignees: Reifenhauser KG, Troisdorf, Germany; Gofini AG, Glarus, Switzerland

[22] Filed: July 10, 1975

[21] Appl. No.: 594,755

[30] Foreign Application Priority Data

July 11, 1974 Germany ............................ 2433242

[52] U.S. Cl. ............................ 264/40.2; 264/210 F; 264/280; 264/294; 264/323

[51] Int. Cl.² ........................ B29J 5/00; B29C 17/00

[58] Field of Search ............. 264/40, 280, 294, 323, 264/210 F

[56] References Cited

UNITED STATES PATENTS

| | | | |
|---|---|---|---|
| 3,185,924 | 5/1965 | Locher | 264/40 |
| 3,757,211 | 9/1973 | Goto | 264/40 |
| 3,892,043 | 7/1975 | Bonikowski | 264/40 |
| 3,904,338 | 9/1975 | Straumanis | 264/40 |

*Primary Examiner*—Willard E. Hoag
*Attorney, Agent, or Firm*—Karl F. Ross; Herbert Dubno

[57] ABSTRACT

An extruder is operated continuously to produce a plastically deformable strand that is pulled through a calibrating die and a cooling by a withdrawal arrangement downstream of the die in the bath. A sensor detects the volume of the strand between the tool and the extruder and controls the withdrawal rate in accordance with the volume of the strand between the tool and the extruder so as to produce an accurately calibrated extrusion. The sensor may engage the strand at the bank formed immediately upstream of the mouth of the calibrating die or may be upstream therefrom and detect the hang or droop of the strand between the die and the extruder.

5 Claims, 5 Drawing Figures

METHOD OF CALIBRATING EXTRUDED FILAMENTS

FIELD OF THE INVENTION

The present invention relates to a method of and an apparatus for making a shaped synthetic-resin extrusion. More particularly this invention concerns an apparatus for accurately calibrating the outside of a continuously produced extrusion strand.

BACKGROUND OF THE INVENTION

It is known to produce a shaped synthetic-resin extrusion by continuously ejecting a hot synthetic-resin strand in plastic condition from an extrusion molder or the like and pulling this preshaped strand through a calibrating dye and a cooling bath. The hot strand is accurately shaped by the calibrating dye and is then hardened into this shape as it passed through the cooling bath.

A synthetic-resin extruder generally produces a relatively constant volume/time output rate and the pulling arrangement, in the form of two wheels or two juxtaposed belts that grip the hardened and calibrated strand, usually operates at a relatively constant distance/time rate. Thus when the machine is started a skilled worker sets the extruder and pulling device such that a small mass or bank of material is left immediately upstream of the calibrating die to compensate for slight fluctuations.

In such arrangements it is necessary that a highly skilled worker constantly survey and readjust the machine. Otherwise the bank upstream of the calibrating die might grow too large and allow the synthetic-resin strands to cool excessively before entering this die. Alternatively it is possible that the extrusion rate will decrease somewhat and/or the pulling rate will decrease somewhat and/or the pulling rate will increase so that the bank will be eliminated and the strand will become too thin to calibrate properly.

Another difficulty with such a system is that it is very difficult to apply to an arrangement which is intended to produce C-, T-, U-, and I-shaped extrusions. Furthermore, when a thermosetting resin is employed there is the danger that the material will set in the bank so much that it will no longer be plastic and will therefore be impossible to calibrate with any precision. Thus it is frequently necessary to shut down the apparatus and throw out the strand in production in order to readjust the arrangement and start production again.

OBJECTS OF THE INVENTION

It is therefore an object of the present invention to provide an improved method of making a synthetic-resin extrusion.

Another object is the provision of an improved apparatus for making such an extrusion which overcomes the above-given disadvantages.

Yet another object is to provide an improved method of and apparatus for making a continuous synthetic-resin extrusion wherein it is possible accurately to calibrate the outside of the extrusion and waste is reduced to a minimum.

SUMMARY OF THE INVENTION

These objects are achieved according to the present invention in a method of the above-described general type wherein an actual-value signal is generated corresponding to the condition of the strand upstream of the calibrating tool. This actual-value signal is compared with a set-point signal and the extrusion rate or the withdrawal rate is varied in accordance with the difference between the signals in order to equalize them. Thus a sensor is provided between the extruder and the calibrating tool to measure the volume of the strand in this region and produce the actual-value signal.

According to the present invention the rates which are determinative of the quality of the extrusion and precision of the calibration are automatically and exactly controlled in order to maximize efficiency. With the system according to the present invention it is also possible to use a calibrating die having a shape different from that of the extrusion orifice of the extruder.

The invention is based on the surprising discovery that the volume of material between the calibrating tool and the outlet orifice of the extruder is determinative of the quality of the product. Thus when the volume of this mass is maintained within a predetermined range it is possible to produce a product of precise dimensions in a manufacturing process that operates smoothly and without waste. A relatively large bank or thickening in the strand is produced immediately upstream of the calibrating tool so that the outside surfaces of this strand are precisely shaped. With such a method the shaping principally takes place within the calibrating tool rather than within the extruder. Thus in accordance with the present invention it is possible to use the same extruder to produce a variety of different extrusions. The single most expensive part of the production line, that is the extruder, may be set up so as to produce a round-section strand which can thereafter be shaped into a polygonal-section strand, or a U-, C-, T-, or I-shaped strand. In all of the prior-art systems it was absolutely essential that the outlet opening of the extruder be of the same exact shape as that of the calibrating tool. Thus in accordance with the present invention the extruder serves merely to supply the synthetic-resin strand at the appropriate volume/time rate to the calibrating arrangement.

In accordance with the present invention it is also possible to use an extruder that produces a strand of uniform section at a constant rate, and thereafter to calibrate the outside of this strand and obtain the necessary shape by varying the withdrawal speed.

According to the cross-sectional shape of the extrusion to be produced the set-point value can lie within a relatively wide range, for example a welt-like bank in front of the calibrating tool can be allowed to vary between 5 mm and 10 mm. According to the present invention the withdrawal rate is only changed when the actual-value signal varies from the set-point signal. Thus it is possible to cancel out the inevitable effects of variation and extrusion rate caused by the capture of air bubbles or the like within the extruder or a change in consistency as the apparatus and calibrating tool heat up.

According to the present invention the volume of the mass between the extruder tool and the output side of the extruder is measured by physically feeling the strand as it passes between these two points or at least sensing with electric eyes or the like. The size of the bank, that is the wad or mass of material that backs up immediately upstream of the calibrating tool, is measured in accordance with a feature of this invention. It also lies within the scope of this invention to measure the so-called hang or droop of the strand between the tool and the extruder. Either of these measurements has been found to be directly proportional to the volume of the strand between the tool and the extruder.

According to another feature of this invention the strand is pulled, after cooling in a bath, through another calibrating tool. This second calibration does not however take place with any banking or buildup upstream of the calibrating tool but merely serves to give the extrusions a very fine finish and eliminate imperfections caused by irregular shrinking or cooling. With such an arrangement it is possible to produce solid extrusion as well as tubing-type hollow extrusions.

In accordance with the present invention it is possible to use a conventional extrusion manufacturing system with only minor modifications so as greatly to increase output quality and decrease waste. The upstream end of the passage of the calibrating tool is preferably flared in an upstream direction so as to form a regular bank and facilitate production according to the present invention. Downstream from this flared portion the calibrating tool is of regular cross section and at the changeover region between the flared and the regular-sectioned portions of the passage an inwardly open groove is provided that is connected to a vacuum pump in order to ensure proper drawing in and holding of the strand. This also prevents the coolant in the downstream bath from being lost through the calibrating tool. In this manner a skin-like hardening of the strand is avoided.

BRIEF DESCRIPTION OF THE DRAWING

The above and other objects, features, and advantages of the invention will become more readily apparent from the following description, reference being made to the accompanying drawing in which.

SPECIFIC DESCRIPTION

Figures 1, 4, 5:
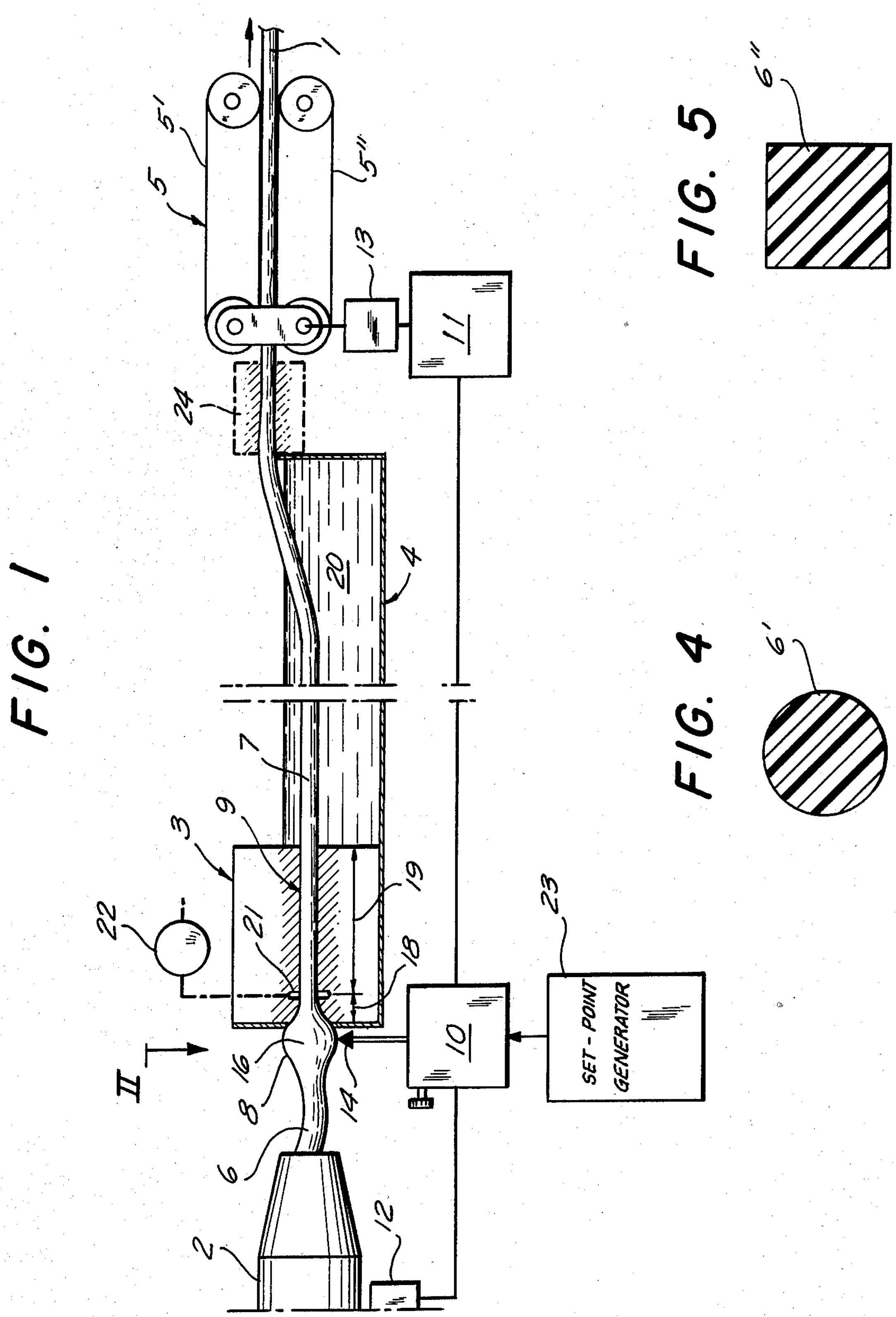
FIG. 1 is a side schematic view of a system for carrying out the method according to the present invention.

As illustrated in FIG. 1 an extruder 2 produces a strand 1 that is pulled by a two-belt withdrawal arrangement 5 through a calibrating die 3 and a cooling arrangement 4. The extruder 2 is similar to that described on page 98 of WHITTINGTON'S DICTIONARY OF PLASTICS (Technomic: 1968).

The strand 1 has a portion 6 between the upstream end of the die 3 and the downstream end of the extruder 2. This portion 6 issues from the extruder as shown at 6' at FIG. 4 with a round cross sectional shape, and then forms an even all-around welt or bank 16 before passing through a passage 9 in the die 3. This passage 9 has a flared upstream section 18 and a constant-section downstream portion 19 of square shape so as to impart a square section as indicated at 6'' in FIG. 5 to the strand 1. After issuing from the die 3 a calibrated portion 7 of the strand 1 passes through a cooled water bath 20 and then through another finishing die 24 before being engaged between the two belts 5' and 5'' of the withdrawal device 5.

The extruder 2 has a drive 12 and the withdrawal device 5 has a drive 13. A control unit 11 is connected to the drive 13 and to a comparator 10 which is also connected to the drive 12 and to a feeler 14 engageable with the outer surface 8 of the bank 16. The set-point generator 23 is also connected to the comparator 10.

Figure 2:
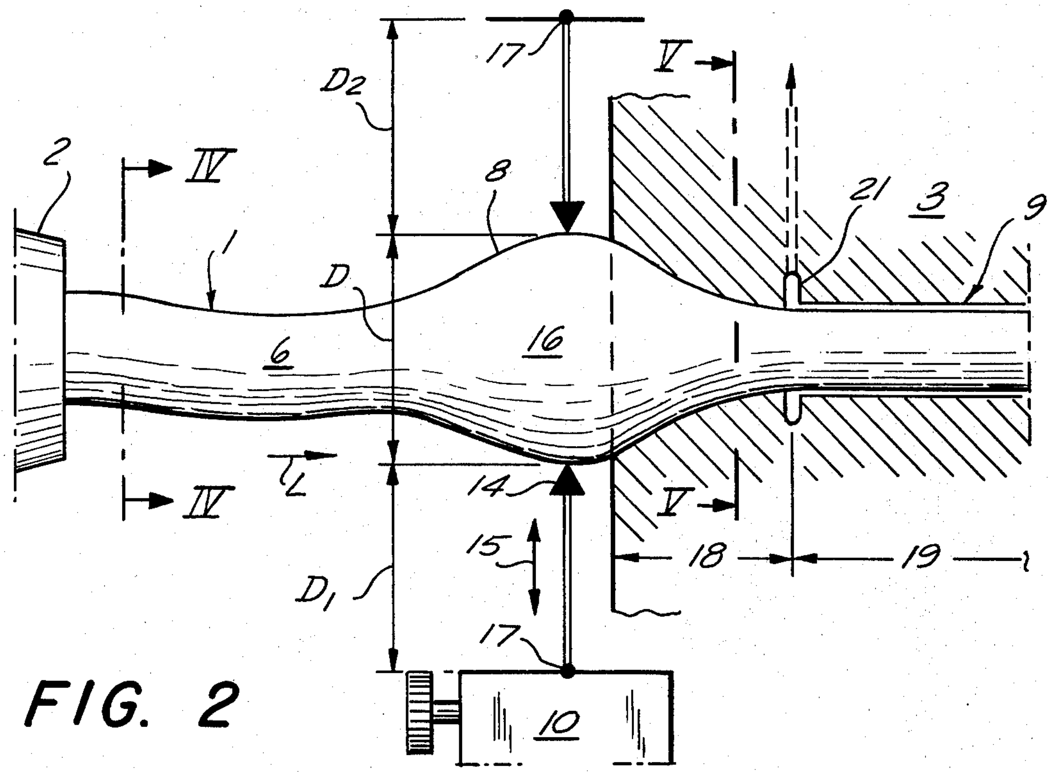
FIG. 2 is a large-scale view of the detail indicated by arrow II of FIG. 1.
Figure 3:
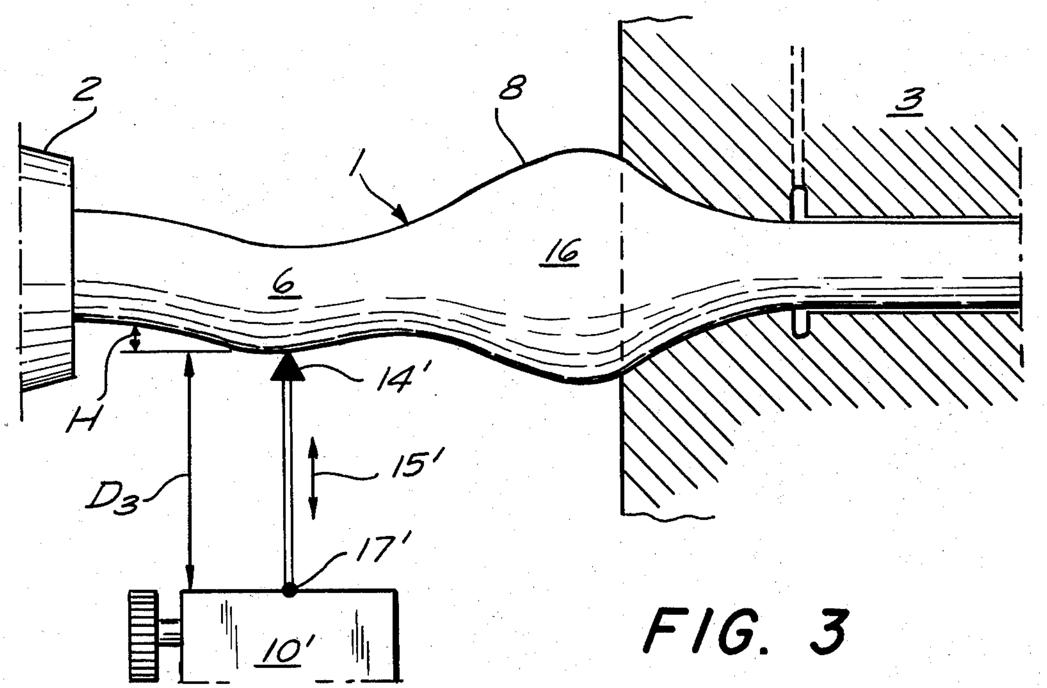
FIG. 3 is a view similar to FIG. 2 illustrating another arrangement according to this invention, and FIGS. 4 and 5 respectively are sections taken along lines IV—IV and V—V of FIG. 2.

As indicated in FIG. 2 the feeler 14 is displaceable as indicated by double headed arrow 15 in FIG. 2 perpendicular to the longitudinal direction L of the strand. The sensor arrangement is provided below or above the bank 16 so as to measure the distance $D_1$ or $D_2$ between points 17 below and above the bank 16. These distances $D_1$ and $D_2$ are proportional to the overall diameter D of the bank 16 which is proportional to its mass. It is also possible according to the present invention as indicated in FIG. 3 to use a sensor-comparator 10' carrying a sensor 14' vertically displaceable relative to a fixed point 17' in the direction of arrow 15' below a section of the strand portion 6 upstream of the bank 16. In this manner the hang H is measured by measuring the distance $D_3$ between the bottom of the strand portion 6 and the fixed point 17' below this strand portion 6. This hang H is directly proportional to the volume of the strand portion 6 between the upstream and of the die 3 and the downstream outlet of the extruder 2.

FIG. 1 also shows how between the flared section 18 of the passage 9 and the regular cross-section portion 19 there is provided an outwardly open groove 21 connected to a vacuum pump 22 that serves to pull the liquid in the bath 20 in through the passage 9 around the strand and cool it and the die 3.

I claim:

1. In a method of making a synthetic-resin extrusion wherein a synthetic-resin strand is continuously expelled by an extruder at an extrusion rate, is then pulled through a calibrating tool at a withdrawal rate, and is cooled and hardened, with the strand forming a bank upstream of the calibrating tool, the improvement comprising the steps of:

generating an actual-value signal corresponding to the volume of said strand between said tool and said extruder, comparing said actual-value signal with a set-point signal, and varying one of said rates in accordance with the difference between said signals to equalize said signals.

2. The improvement defined in claim 1 wherein said withdrawal rate alone is varied.

3. The improvement defined in claim 1 wherein said volume is measured by sensing the diameter of said strand at said bank.

4. The improvement defined in claim 1 wherein said volume is measured by sensing the extent of downward hang of said strand between said extruder and said tool.

5. The improvement defined in claim 1, further comprising the step of drawing said strand through a second calibrating tool after drawing said strand through the first calibrating tool and cooling and hardening said strand.

* * * * *